(12) United States Patent
Ilmanen (10) Patent No.: US 9,771,674 B2
(45) Date of Patent: Sep. 26, 2017

(54) SOCK RULER SYSTEM (71) Applicant: Denise Ilmanen, Novato, CA (US)

(72) Inventor: Denise Ilmanen, Novato, CA (US)

( * ) Notice: Subject to any disclaimer, the term of this patent is extended or adjusted under 35 U.S.C. 154(b) by 188 days.

(21) Appl. No.: 14/693,568

(22) Filed: Apr. 22, 2015

(65) Prior Publication Data

US 2015/0361601 A1 Dec. 17, 2015

Related U.S. Application Data (60) Provisional application No. 62/011,486, filed on Jun. 12, 2014.

(51) Int. Cl.
| D06H 3/16 | (2006.01) |
| G01B 3/02 | (2006.01) |
| D04B 3/00 | (2006.01) |

(52) U.S. Cl.
CPC ............. *D04B 3/00* (2013.01); *D06H 3/16* (2013.01); *G01B 3/02* (2013.01)

(58) Field of Classification Search
CPC ... D04B 3/00; D06H 3/16; G01B 3/02; G01B 3/04
USPC ........... 33/11, 17 A, 2 A, 3 A, 3 B, 3 C, 3 R, 33/563, 565, 566
See application file for complete search history.

(56) References Cited

U.S. PATENT DOCUMENTS

| 1,790,416 | A | | 1/1931 | Guillot | |
| 2,142,767 | A | * | 1/1939 | Stemm | D04B 3/00 2/211 |
| 2,558,974 | A | | 6/1949 | Mecklenburger | |
| 2,537,417 | A | * | 1/1951 | Merske | B65D 85/18 206/281 |
| 2,543,476 | A | * | 2/1951 | Southern | D04B 3/00 33/484 |
| 2,806,286 | A | * | 9/1957 | Weiner | G01B 3/02 33/2 R |
| 3,136,067 | A | | 6/1964 | Homer | |
| 3,217,336 | A | | 11/1965 | Wikler | |
| 3,356,272 | A | * | 12/1967 | Berry | D06C 5/005 223/75 |
| 3,359,640 | A | * | 12/1967 | Kirkland | A43D 1/027 33/3 A |
| 4,211,010 | A | * | 7/1980 | Burke et al. | A41H 3/002 33/11 |

(Continued)

FOREIGN PATENT DOCUMENTS

| GB | 738696 | A | * | 10/1955 | ............... D06H 3/16 |
| GB | 854401 | A | * | 11/1960 | ............. B65D 85/18 |

*Primary Examiner* — R. A. Smith
(74) *Attorney, Agent, or Firm* — Steven A. Nielsen; www.NielsenPatents.com (57) ABSTRACT A sock ruler 101, useful for knitting socks and other garments, features a curved heel section 120 that includes an apex 123 and two termination points 125 that are connected to a straight section 130. The straight section ends at a flat end section 190. Distance markings 110 may be found and spaced along the lengthwise portion 113, while the distance markings are written across the width 115 of the sock ruler. The curved heel section has a concave shape useful in knitting classical sock components such as sock cuffs 210 and sock heel flaps 230. The curved heel section allows the sock ruler to stay within a sock during sock knitting, making the distance markings readily available.

2 Claims, 8 Drawing Sheets (56) References Cited

U.S. PATENT DOCUMENTS

| | | | |
|---|---|---|---|
| 5,966,824 A * | 10/1999 | Vazquez | A41H 3/002 33/11 |
| 6,178,785 B1 | 1/2001 | Samata | |
| 6,745,481 B1 * | 6/2004 | Faircloth | D06H 3/16 33/11 |
| 7,738,991 B2 | 6/2010 | Klumpp | |
| 7,950,158 B2 * | 5/2011 | Cheng | |
| | | Tam et al. | A41D 19/046 33/17 R |
| 8,544,300 B2 | 10/2013 | Kaneda et al. | |

* cited by examiner

SOCK RULER SYSTEM

CROSS-REFERENCE TO RELATED APPLICATIONS

This is a utility application based upon U.S. patent application Ser. No. 62/011,486 filed on Jun. 12, 2014. This related application is incorporated herein by reference and made a part of this application. If any conflict arises between the disclosure of the invention in this utility application and that in the related provisional application, the disclosure in this utility application shall govern. Moreover, the inventor(s) incorporate herein by reference any and all patents, patent applications, and other documents hard copy or electronic, cited or referred to in this application.

BACKGROUND OF THE INVENTION (1) Field of the Invention

The invention generally relates to garment fabrication systems. More particularly, the invention relates to means and methods of creating a sock or other garment by use of a measuring system.

(2) Description of the Related Art

Various clothing construction measuring systems are known in the related art. For example, U.S. Pat. No. 1,790,416 issued on Jan. 27, 1931 to Guillot discloses a complex garment making system using rigid rods, flanges and other bulky items. Guillot fails to contemplate the nuances of sock production.

U.S. Pat. No. 2,558,974 issued on Jun. 1, 1949 to Mecklenburger discloses a flexible measuring tape having voids to comport with size changes of a knitted product. The flexible measuring tape of Mecklenburger does not comport to a heal flap section of a sock and is used upon the top only of a knitting project.

U.S. Pat. No. 3,217,336 issued on Nov. 29, 1963 to Wikler discloses various sock embodiments or items of knitted footwear. While the Wikler sock does provide an interesting toe section and for the use of yarns of different weights, Wikler fails to disclose or suggest means of measuring sock components during fabrication.

U.S. Pat. No. 6,178,785 issued on Jan. 30, 2001 to Samata discloses the use of three trapezoidal knit fabric lines used to create a sock heal section. The Samata sock is made even more complex by the use of various gore lines. The socks and knitting methods of Samata are based upon an unusual trapezoidal structure (see FIG. 6 of Samanta) that has failed to become popular. Samata also fails to provide means of measurement during sock construction.

U.S. Pat. No. 7,738,991 issued on Jun. 15, 2010 to Klumpp discloses means of making a footlet. The Klumpp footlet uses a programmable circular knitting machine and is hence not useable in knitting by hand. Klump also fails to provide means of measurement during production.

U.S. Pat. No. 8,544,300 issued on Oct. 1, 2013 to Kaneda et al discloses a knitted sock having various needle lowering areas and needle raising areas. While Kadeda produces various sock friction areas, Kandea fails to provide means of measuring sock features during production.

BRIEF SUMMARY OF THE INVENTION

The present invention overcomes shortfalls in the related art by presenting an unobvious and unique combination and configuration of methods and components to efficiently and artfully knit or otherwise create socks, stockings and other garments.

The invention overcomes shortfalls in the related art by using a new sock ruler system. In one embodiment, a sock ruler system comprises a rounded heel section, a cuff measuring section, cuff measurement indicia and a toe measurement section comprising toe measurement indicia.

In another disclosed embodiment, a new sock ruler system comprises a curved heel section at one longitudinal end and a flat end section at a second longitudinal end. Measurement indicia may be disposed or written crosswise or along the width of the sock ruler. Measurement indicia values may span the longitudinal axis or lengthwise portion of the sock ruler.

In a disclosed embodiment, in general, a round heel section is used with a cuff measuring section to knit an upper or cuff section of a sock. Once the desired cuff section is created, the round heel section may be used as a starting heel point, to reference the heel position. Once the heel position is secured within or upon a sock in progress, a toe measurement section may used to indicate where the sock in progress should be tapered down to conform to a predetermined foot size.

In a disclosed embodiment, sock construction or garment knitting may start at a cuff and then proceed to a leg section. The cuff section is optional. The lengths of the cuff and/or leg sections may be monitored and dictated by the measurement markings disposed upon a disclosed sock ruler.

A curved heel section of a disclosed sock ruler overcome shortfalls in the art in many respects. A curved heel section tappers inwardly and thus comports to fitting inside of a cuff section during the knitting process. As the cuff section is of a concave shape, the curved heel section provides an internal measurement reference point without interfering with the knitted shape of the cuff.

Knitting around the sock ruler allows for constant viewing of the sock ruler measurement lines without the need to pin or otherwise attach the sock ruler to the knitting project. The curved heel section overcomes shortfalls in the related art by providing an apex or apex section that may be easily positioned at the top part of a sock cuff. This apex to cuff positioning secures the ruler and allows for continues and convenient ruler viewing. While the sock cuff is being knitted, the curved heel section allows for the knitting of a traditional cuff that tappers inwardly toward the top.

The straight longitudinal section, lower from the curved heel section may be used to measure the progress of a knitted leg section. A sock leg section may be attached just below a sock cuff section. Measurement lines upon a sock ruler may be used to determine the stopping point of the leg section. At the lower end of the sock leg section, a sock heel flap section may be started. Here again the curved heel section of the sock ruler overcomes shortfalls in the art by having an outer curvature that comports to classical sock components, whether the component is the cuff or the heel flap. As the heel flap is being knitted at the lower end of the leg section, the curved heel section may be placed at the transition point between the leg section and heel flap section.

As a typical heel flap section is concave, the curved heel section of the sock ruler does not interfere with knitting. The curved heel section of the sock ruler allows the ruler to be inserted into the heel flap, thus usefully positioning the ruler for further measurements. As knitting of the heel flap progresses, the start of the foot section may begin, with the starting point found by reference to the measurement marking on the sock ruler. After a desired length of foot section is knitted, the toe section may be knitted. The sock ruler may act as a reference for starting the foot section to toe section transition. The sock ruler may be retained inside of the sock during knitting. Moreover, during and after the construction of the heel flap, the curved heel section of the sock ruler may stay in the heel flap and thus provide a secure and convenient measuring instrument.

These and other objects and advantages will be made apparent when considering the following detailed specification when taken in conjunction with the drawings.

REFERENCE NUMERALS IN THE DRAWINGS

100 an embodiment in general sometimes called a sock ruler system or stocking measurement tool

101 sock ruler with measurement indicia spanning the longitudinal portion

110 measurement indicia from curved heel section 120 to flat end section 190

113 longitudinal axis or lengthwise portion of sock ruler

115 crosswise axis or width of sock ruler

120 curved heel section of a sock ruler

123 apex of curved heel section 120

125 transition point between curved heel section 120 and straight section 130

130 a straight section

140 cuff indicia or markings upon or near a curved heel section 120, the marking used to aid in creating a cuff of a desired length

160 heel to toe measurement section

180 toe measurement markings or indicia, used to create a sock of a predetermined foot size

190 flat end section of sock ruler

200 a sock or stocking

210 cuff of sock

220 leg section of sock

230 heel flap section of sock

240 foot section of sock

DETAILED DESCRIPTION OF EMBODIMENTS OF THE INVENTION

The following detailed description is directed to certain specific embodiments of the invention. However, the invention can be embodied in a multitude of different ways as defined and covered by the claims and their equivalents. In this description, reference is made to the drawings wherein like parts are designated with like numerals throughout.

Unless otherwise noted in this specification or in the claims, all of the terms used in the specification and the claims will have the meanings normally ascribed to these terms by workers in the art.

Unless the context clearly requires otherwise, throughout the description and the claims, the words "comprise," "comprising" and the like are to be construed in an inclusive sense as opposed to an exclusive or exhaustive sense; that is to say, in a sense of "including, but not limited to." Words using the singular or plural number also include the plural or singular number, respectively. Additionally, the words "herein," "above," "below," and words of similar import, when used in this application, shall refer to this application as a whole and not to any particular portions of this application.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while steps are presented in a given order, alternative embodiments may perform routines having steps in a different order. The teachings of the invention provided herein can be applied to other systems, not only the systems described herein. The various embodiments described herein can be combined to provide further embodiments. These and other changes can be made to the invention in light of the detailed description.

Any and all the above references and U.S. patents and applications are incorporated herein by reference. Aspects of the invention can be modified, if necessary, to employ the systems, functions and concepts of the various patents and applications described above to provide yet further embodiments of the invention.

Figure 1:
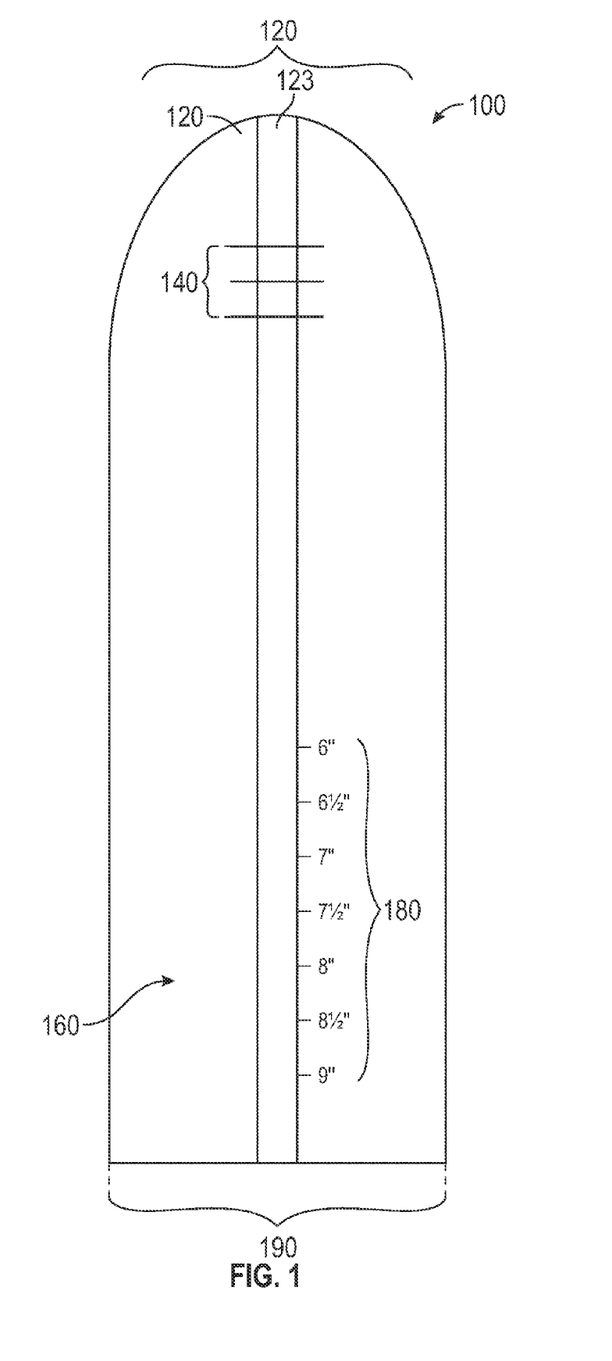
FIG. 1 depicts a plan view of a disclosed sock ruler and sock construction system

FIG. 1 depicts a sock ruler system or stocking measurement tool 100 in general. A sock ruler 101 may comprise a curved heel section 120, adjacent to cuff indicia 140 or measurement lines used to construct a sock cuff at a desired length. In the sample shown, cuff measurement lines 140 are shown at distances from the curved heel section 120 to be one inch, two inches and three inches, while other distances and/or increments are contemplated.

FIG. 1 further depicts a toe measurement section 160 or a heel to toe section. The toe measurement section 160 may comprise a plurality of toe measurement markings 180 or indicia to assist in creating a sock of a desired foot size. In the shown example, six to nine inches is measured out in half inch increments upon the toe measurement section while other distances and or increments are contemplated.

Figure 2:
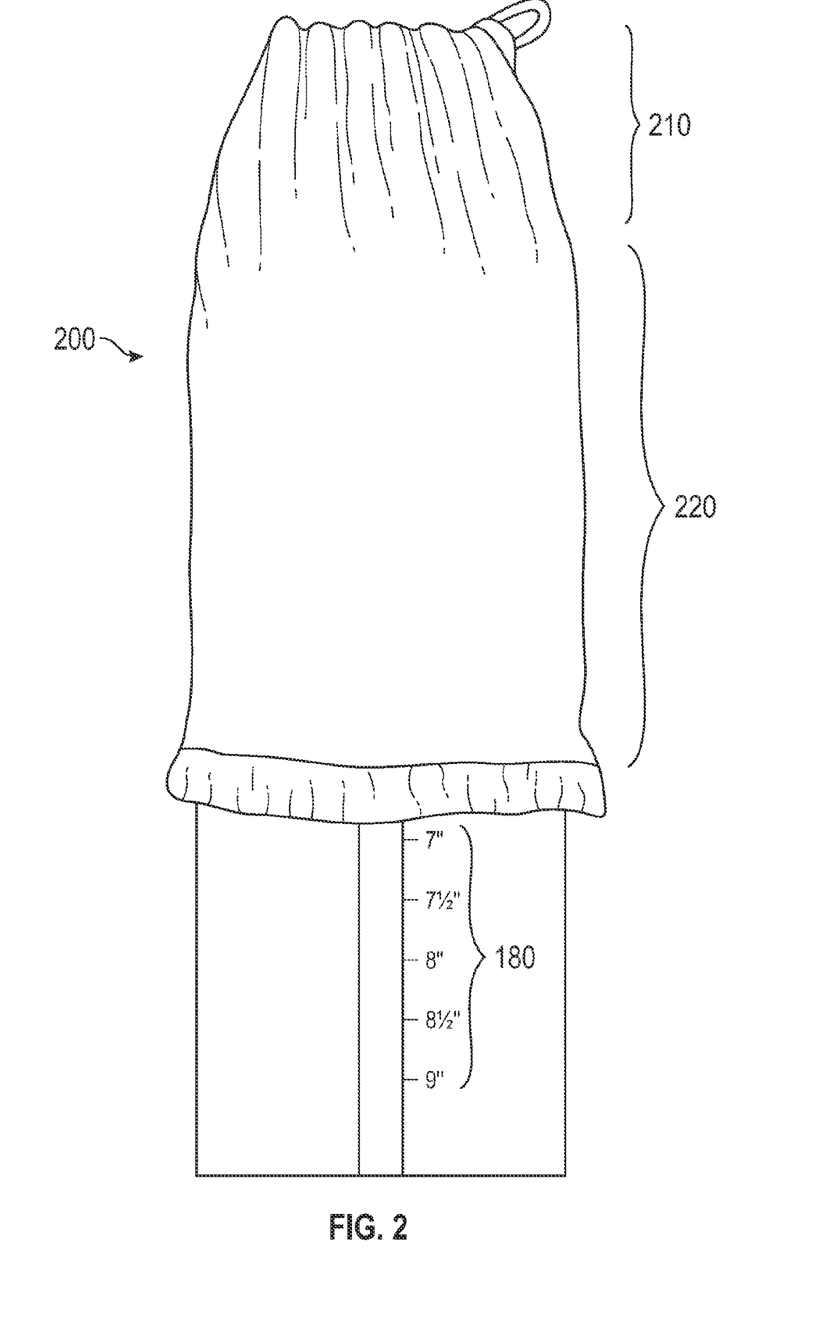
FIG. 2 depicts a plan view of a sock in progress integrated with a disclosed sock ruler or sock construction system

FIG. 2 depicts a sock 200 or stocking in progress constructed upon a disclosed sock ruler. A sock may comprise a cuff 210 and a leg section 220.

In general, the disclosed embodiments assist in creating socks or similar items using a curved heel section 120 as a starting point for both sock cuff lengths and foot lengths. The dual functions of the curved heel section 120 present new efficiencies in clothing tools and in methods of clothing construction. The curved shape of the curved heel section 120 assists a user in orientating the sock ruler 101 and in remembering which end is which. The curved heel section mirrors the natural curve of human heel, and hence acts as a natural and intuitive reference point for heel to toe measurements. The multiple lines of toe measurement markings 180 provide assistance in informing a user of where a sock should start to become narrower so as to produce an end product with a correct overall length and correct shape.

Ruler systems of any size are contemplated and include child sized ruler systems.

Figure 3:
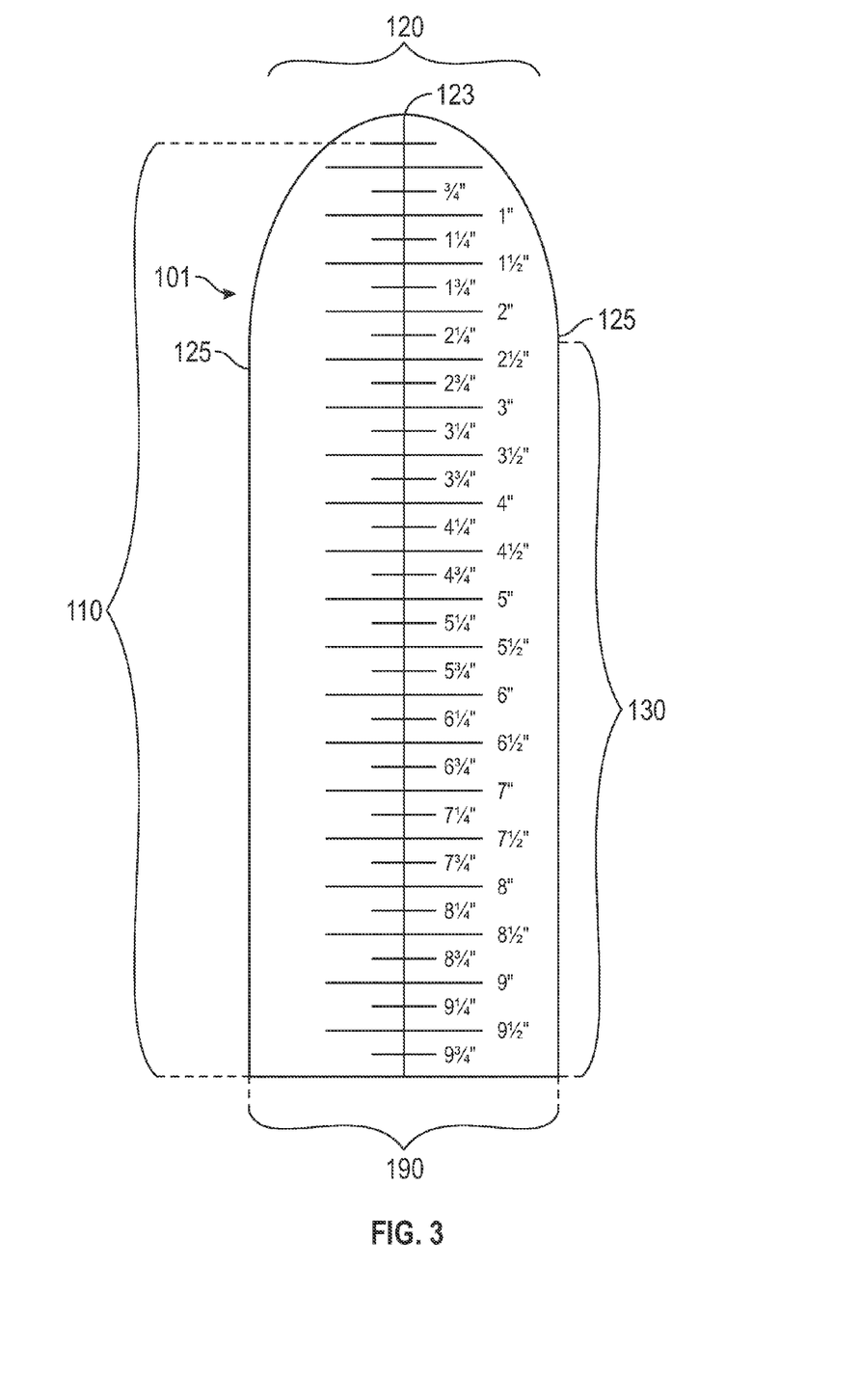
FIG. 3 depicts a plan view of a disclosed embodiment

FIG. 3 depicts a disclosed sock ruler 101 comprising a curved heel section 120 that may comprise an apex 123. The curved heel section 120 may transition into a straight section 130 at a transition point 125. The transition point 125 overcomes shortfalls in the art by enabling the curved heal section 120 that comports to construction of a cuff and heel flap. A disclosed sock ruler may have measurement marks or measurement indicia 110 from the apex 123 to the flat end section 190.

Figure 4:
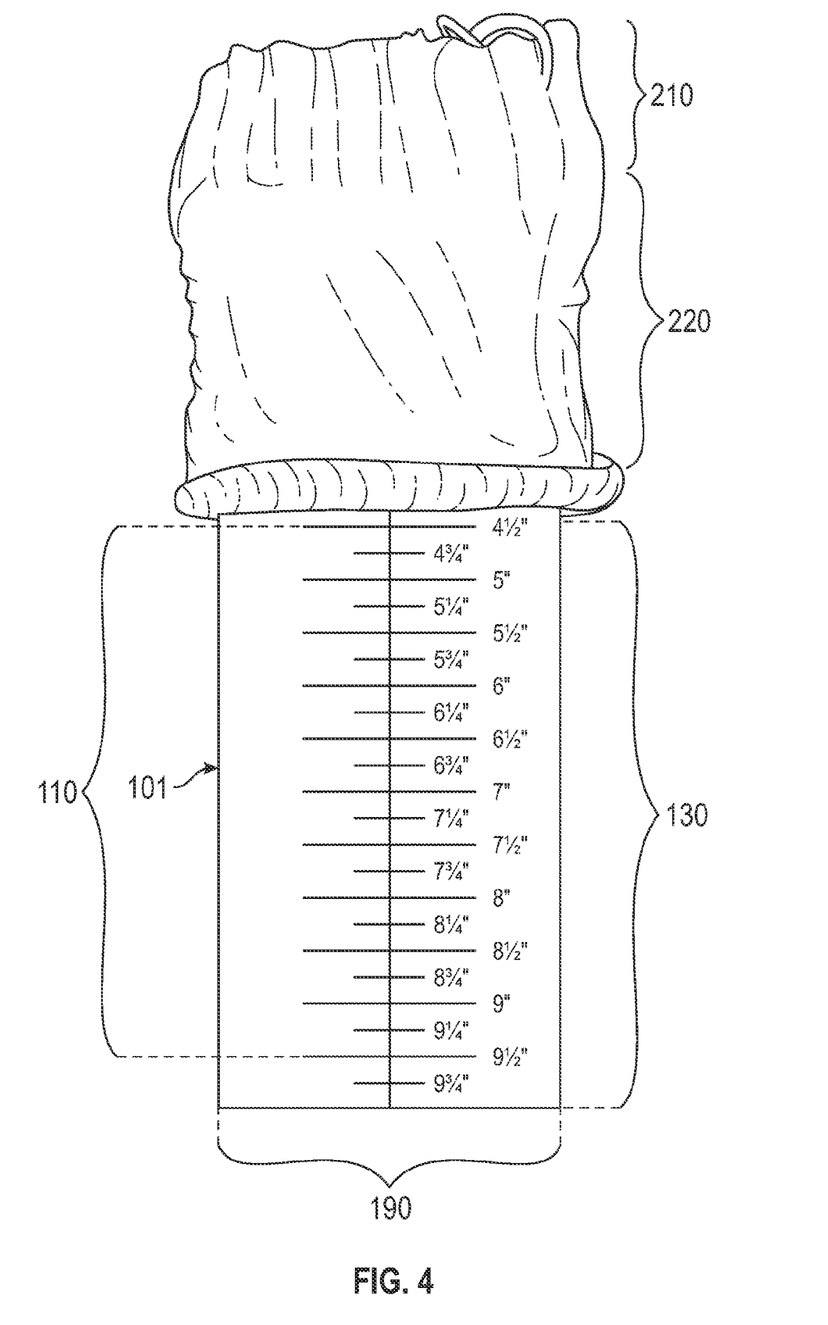
FIG. 4 depicts a leg section of sock being constructed upon a disclosed embodiment

FIG. 4 depicts a disclosed embodiment 100 being used to construct a sock cuff 210 and a sock leg section 220. The lower end of the sock leg section 220 is shown to be constructed over a straight section 130 of the sock ruler. The curved heel section of the sock ruler is not visible and is covered by the sock cuff section 210.

Figure 5:
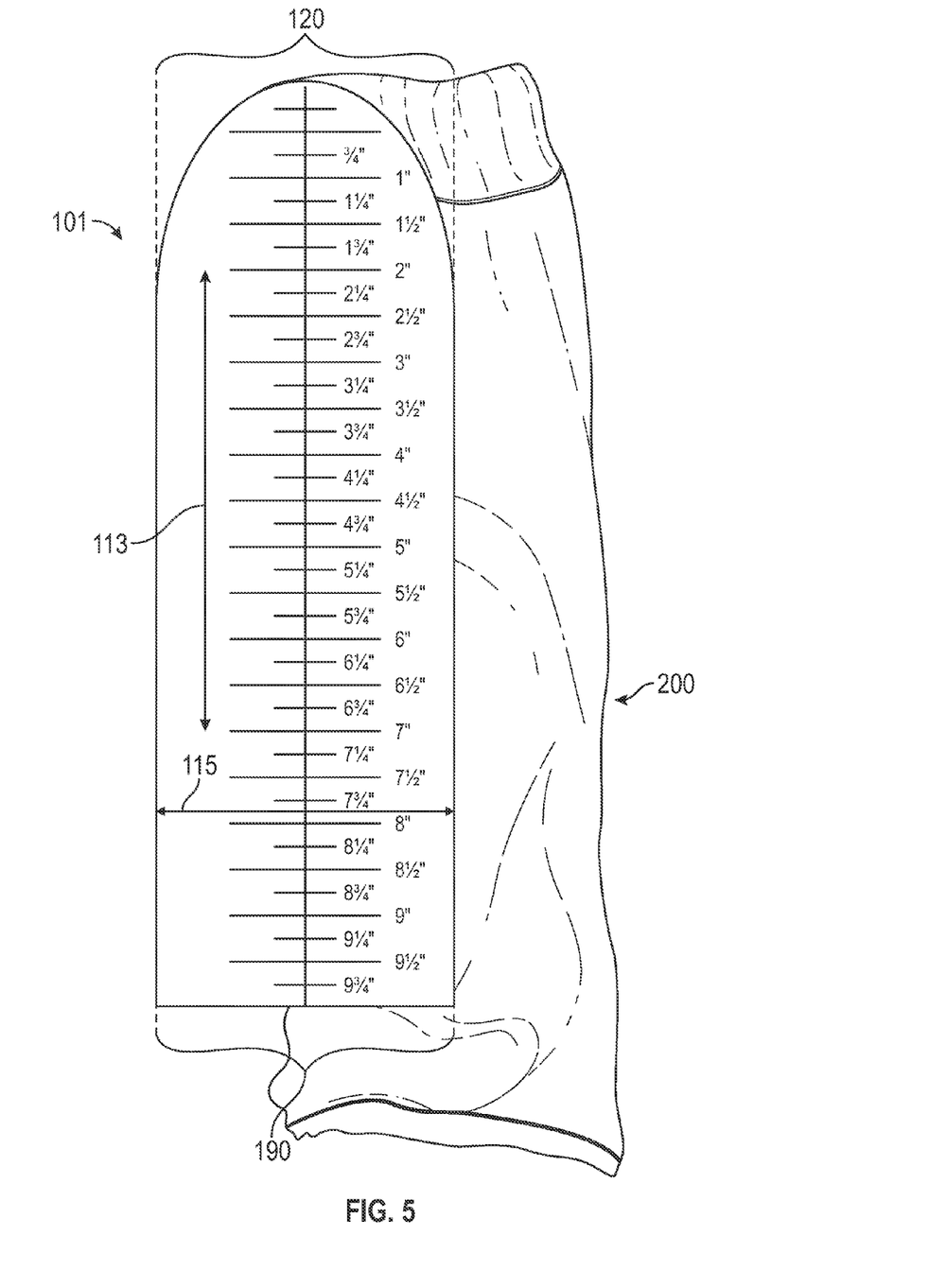
FIG. 5 depicts a disclosed embodiment placed over a completed leg section of sock

FIG. 5 depicts a disclosed sock ruler 101 placed in front of a nearly completed sock 200. A disclosed sock ruler is shown with a curved heel section 120, a longitudinal axis 113 or lengthwise portion, a crosswise axis 115 or width section and a flat end 190.

Figure 6:
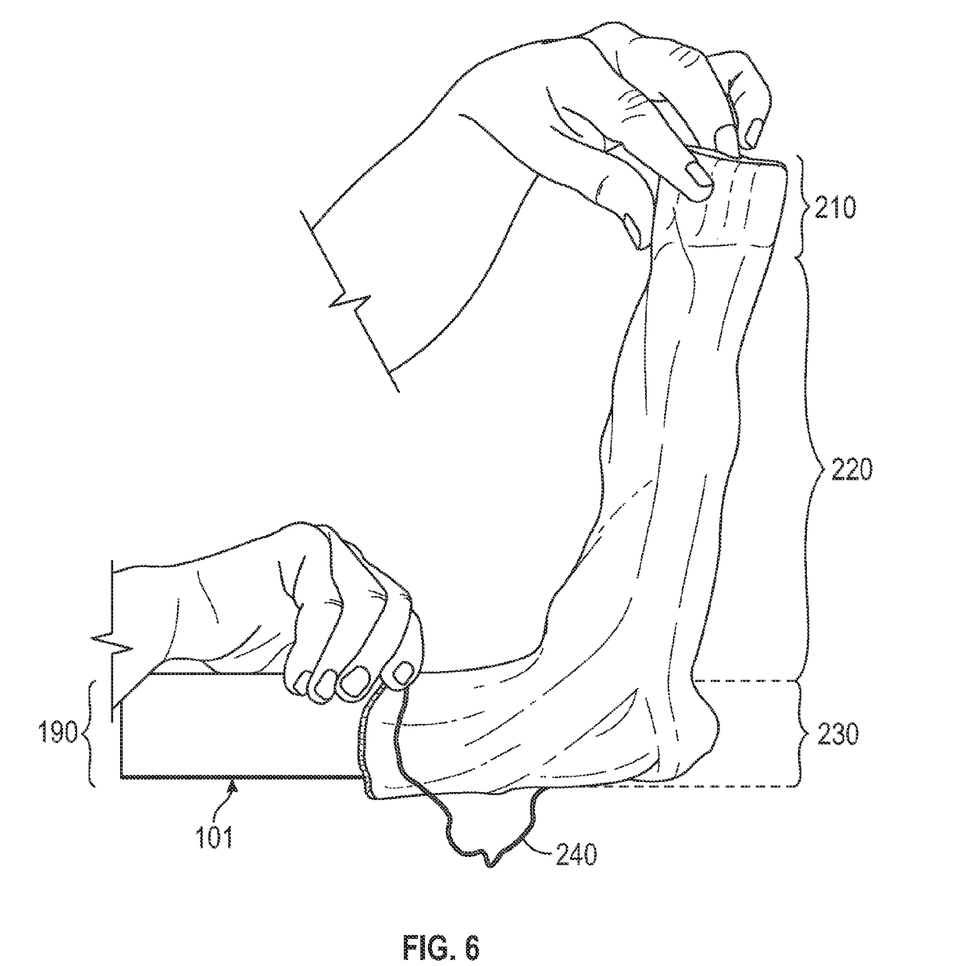
FIG. 6 depicts a disclosed embodiment used in creating a foot and heal section of a sock

FIG. 6 depicts a disclosed sock ruler 101 inserted into a sock foot section 240 and sock heel flap section 230. The sock heel flap section 230 is attached to a sock leg section 220 and a sock cuff section 210 is attached to the sock leg section. The curved heel section of the sock ruler is not visible and is pressed into the sock heel flap section 230. This method of sock fabrication takes advantage of the concave shape of the curved heel section of the sock ruler. As shown, the sock ruler stays in the sock during construction and is thus readily available for viewing. Thus, the sock ruler is easy to see during knitting. In FIG. 6, the end of the foot section is easy to measure as the sock ruler is secured in place by use of the curved heel section.

Figure 7:
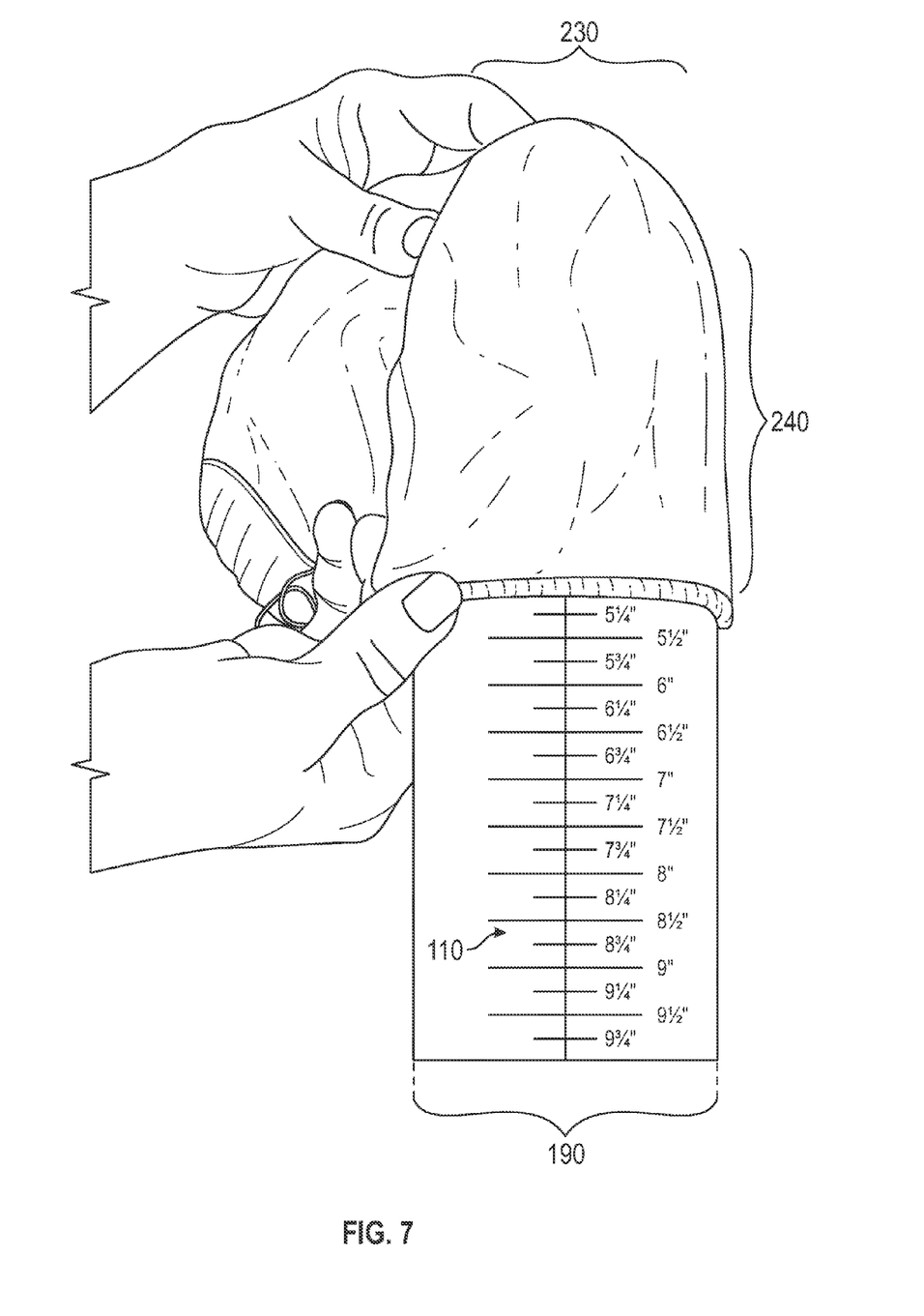
FIG. 7 depicts a perspective view of a disclosed embodiment used in creating a foot and heal section of a sock

FIG. 7 may be considered a bottom view of FIG. 6 and depicts a disclosed sock ruler used in knitting a foot and heel flap section of a sock. As described above, measurement markings 110 assist in knitting the sock foot section 240 to a desired length.

Figure 8:
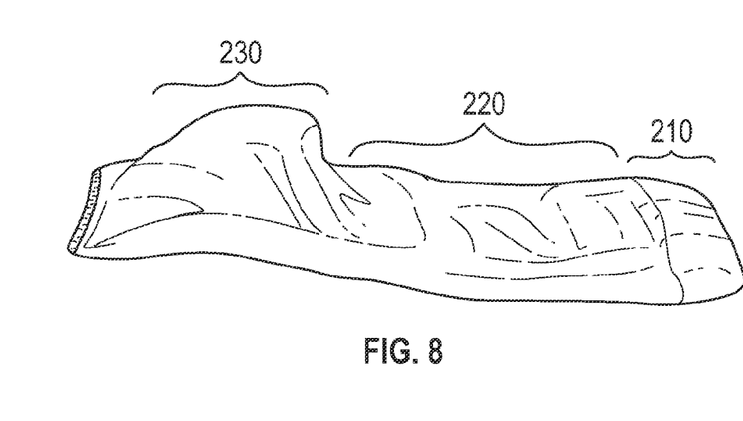
FIG. 8 depicts a perspective view of an uncompleted sock

FIG. 8 depicts a sock in progress and shows a heel flap section 230, sock leg section 220 and a sock cuff section 210.

Figure 9:
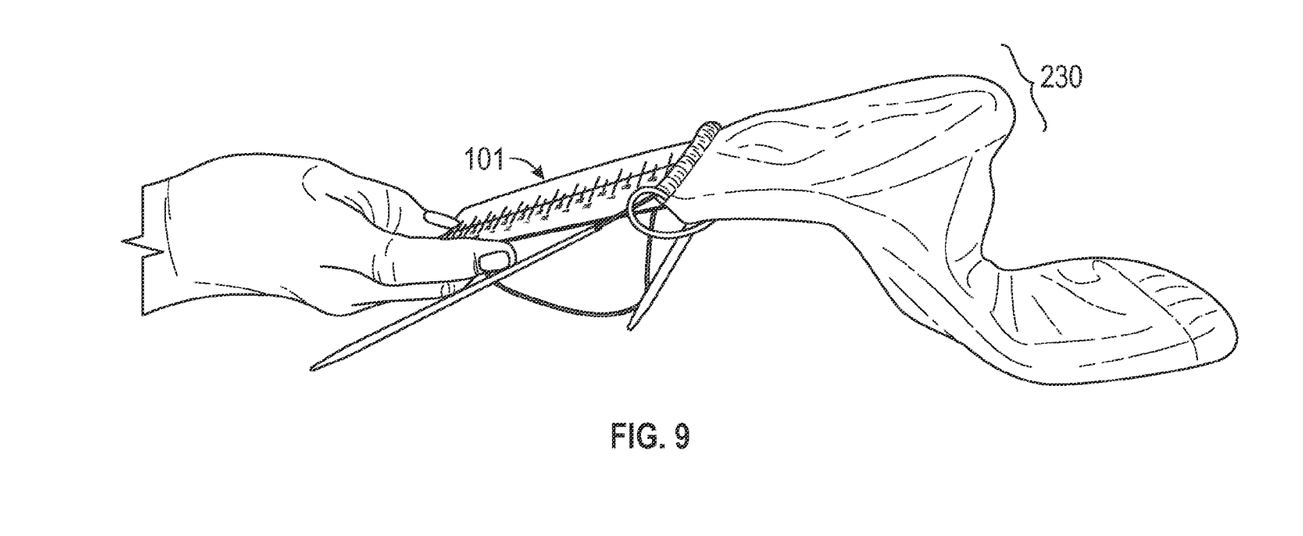
FIG. 9 depicts a perspective view of a disclosed embodiment used to finish construction of a sock

FIG. 9 depicts a perspective view of a sock being knitted with a sock ruler 101 inserted into a sock heel flap 230.

Items.

Disclosed embodiments include the following items.

1. A sock ruler 101 having a curved heel section 120 useful for knitting a sock cuff section 210 and a sock heel flap section 230 and a straight section 130 useful for knitting a sock leg section 220 and a sock foot section 240, the sock ruler comprising:
　a) the curved heel section comprising an apex 123;
　b) the curved heel section comprising a concave shape;
　c) the curved heel section attached to the straight section at two transition points 125;
　d) the straight section comprises a flat end section 190;
　e) measurement indicia 110 deposed upon a flat surface of the sock ruler;
　f) the measurement indicia spanning over a longitudinal axis of the sock ruler; and
　g) the measurement indicia delineating measurements written across a crosswise axis 115 of the sock ruler.

2. The sock ruler of 1 further comprising a second flat side, a curved end edge defined by the curved heel section, a straight end edge defined by the flat end section, and a pair of lengthwise edges defined by the sides of the straight section and sides of the curved heel section.

What is claimed is:

1. A sock ruler having a curved heel section useful for knitting a sock cuff section and a sock heel flap section and a straight section useful for knitting a sock leg section and a sock foot section, the sock ruler comprising:
　a) the curved heel section comprising an apex;
　b) the curved heel section comprising a concave shape;
　c) the curved heel section attached to the straight section at two transition points;
　d) the straight section comprises a flat end section;
　e) a first measurement indicia deposed upon a flat surface of the sock ruler;
　f) the first measurement indicia spanning over a full longitudinal axis of the sock ruler; and
　g) the first measurement indicia delineating measurements written across a crosswise axis of the sock ruler, the first measurement indicia used to measure the length of sock along a leg;
　h) a second measurement indicia disposed upon one end of the sock ruler, the second measurement indicia used to measure toe length in the fabrication of a sock.

2. The sock ruler of claim 1 further comprising a second flat side, a curved end edge defined by the curved heel section, a straight end edge defined by the flat end section, and a pair of lengthwise edges defined by the sides of the straight section and sides of the curved heel section.

* * * * *